(12) United States Patent
Brooks et al.

(10) Patent No.: US 6,499,044 B1
(45) Date of Patent: Dec. 24, 2002

(54) LEADING ZERO/ONE ANTICIPATOR FOR FLOATING POINT

(76) Inventors: Jeffrey S. Brooks, 11704 Astoria Dr., Austin, TX (US) 78733; James S. Blomgren, 1122 Colorado, No. 1810, Austin, TX (US) 78701; David E. Kreml, 91501 Inverness Dr., Spicewood, TX (US) 78669

( * ) Notice: Subject to any disclaimer, the term of this patent is extended or adjusted under 35 U.S.C. 154(b) by 0 days.

(21) Appl. No.: 09/546,412

(22) Filed: Apr. 10, 2000

Related U.S. Application Data

(60) Provisional application No. 60/165,196, filed on Nov. 12, 1999.

(51) Int. Cl.[7] .................................................. G06F 7/50
(52) U.S. Cl. ........................................ 708/211; 708/205
(58) Field of Search ................................ 708/211, 205, 708/501, 212, 552, 670; 714/726; 716/18, 17; 326/105

(56) References Cited

U.S. PATENT DOCUMENTS

| | | | |
|---|---|---|---|
| 4,926,369 A | | 5/1990 | Hokenek et al. |
| 5,317,527 A | | 5/1994 | Britton et al. |
| 5,493,520 A | | 2/1996 | Schmookler et al. |
| 5,633,819 A | * | 5/1997 | Brashears et al. .......... 708/205 |
| 5,798,952 A | * | 8/1998 | Miller et al. ................ 708/211 |
| 5,831,884 A | * | 11/1998 | Suzuki ....................... 708/211 |
| 5,993,051 A | | 11/1999 | Jiang et al. |
| 6,178,437 B1 | * | 1/2001 | Dhong et al. ............... 708/205 |
| 6,275,838 B1 | * | 8/2001 | Blomgren et al. .......... 708/501 |
| 6,360,238 B1 | * | 3/2002 | Dhong et al. ............... 708/205 |

OTHER PUBLICATIONS

Hokenek Erdem et al., Leading 0/1 Anticipator (LZA), Sep. 13, 1989, European Patent Application No. 0362580.*

* cited by examiner

Primary Examiner—Chuong Dinh Ngo
Assistant Examiner—Chat Do
(74) Attorney, Agent, or Firm—Matthew J. Booth; Karen S. Wright; BoothlWright

(57) ABSTRACT

An efficient leading zero/leading one anticipator (LZA) that can operate in parallel with a floating point adder is disclosed. In one embodiment, the LZA can be implemented in three levels of N-NARY logic, wherein the first logic level generates dit-level propagate-generate-zero (PGZ) patterns and carry out signals from the input dits of the adder operands. The second logic level produces a find-zero and a find-one output signal for each two-dit group of the adder result by combining PGZ patterns for the two dits within the group with the carry-out signal from the dit immediately preceding the two-dit group. The third logic level combines find-zero and find-one output signals for each two-dit group to produce find-one and find-zero coarse and medium shift select signals.

28 Claims, 15 Drawing Sheets

```
        A  0000  1110  1100  0000  0000
        B  0000  0010  0000  0000  0000
      PGZ  ZZZZ •PPGZ •PPZZ  ZZZZ  ZZZZ
      SUM  0001  0000  1100  0000  0000
FIND ONE OUTPUT FBOTH FBOTH FBOTH  NF1   NF1
                       ↑
                       └── UNEXPECTED VALUE DUE TO DKCOUT, NO
                           MISPREDICTION OR NORMALIZER CORRECTION
                           REQUIRED IN THIS CASE
```

NOTE: A "•" REPRESENTS A COUT OR DKCOUT CARRY OUT VALUE

FIG. 9A

```
        C  0000  1100  1100  0000  0000
        D  0000  0000  0000  0000  0000
      PGZ  ZZZZ •PPZZ •PPZZ  ZZZZ  ZZZZ
      SUM  0000  1100  1100  0000  0000
FIND ONE OUTPUT FBOTH FBOTH FBOTH  NF1   NF1
                 ↑
                 └── UNEXPECTED VALUE DUE TO DKCOUT, SINGLE-BIT
                     MISPREDICTION, NORMALIZER WILL PERFORM
                     ONE BIT CORRECTION
```

NOTE: A "•" REPRESENTS A COUT OR DKCOUT CARRY OUT VALUE

FIG. 9B

```
        A  0001  0001  0001  0010  0000
        B  1101  1101  1101  1110  0000
      PGZ  PPZG  PPZG  PPZG  PPGZ  ZZZZ
      SUM  1110  1110  1111  0000  0000
FIND ZERO OUTPUT  FBOTH  FBOTH  FBOTH   NF1   NF1
```

↑ UNEXPECTED VALUE DUE TO DKCOUT, NO MISPREDICTION OR NORMALIZER CORRECTION REQUIRED IN THIS CASE

NOTE: A "•" REPRESENTS A COUT CARRY OUT VALUE

FIG. 10A

```
        C  1111  1111  1111  0010  0000
        D  1111  1111  1111  1110  0000
      PGZ  GGGG •GGGG •GGGG  PPGZ  ZZZZ
      SUM  1111  1111  1111  0000  0000
FIND ZERO OUTPUT   NF0   NF0  FBOTH   NF1   NF1
```

↑ UNEXPECTED VALUE DUE TO DKCOUT, SINGLE-BIT MISPREDICTION, NORMALIZER WILL PREFORM ONE BIT CORRECTION

NOTE: A "•" REPRESENTS A COUT CARRY OUT VALUE

FIG. 10B

LEADING ZERO/ONE ANTICIPATOR FOR FLOATING POINT

This application claims the benefit of the earlier filed U.S. Provisional Pat. App. Ser. No. 60/165,196, filed Nov. 12, 1999 (12.11.99), entitled "N-nary Leading Zero/One Anticipator", which is incorporated by reference for all purposes into this specification.

BACKGROUND OF THE INVENTION

1. Field of the Invention

The present invention relates to improving the performance of floating point execution units in a processor. More particularly, the present invention provides a method and apparatus that produces control signals for the normalizer in parallel with the addition operation, thus reducing the latency of the floating point execution pipeline by eliminating the delay of the leading zero/one detector.

2. Description of the Related Art

Within a processor, arithmetic operations may be performed on operands stored in a format known as floating point. An American national standard has been developed in order to provide a uniform system of rules for governing the implementation of floating point arithmetic systems. This standard is identified as ANSI/IEEE Standard No. 754-1985, and is incorporated by reference in this application. As discussed in further detail below, ANSI/IEEE 754-1985 includes rules for representing and storing floating point operands, rules for manipulating them to perform arithmetic operations, and rules for rounding and expressing the result of the arithmetic operations(s).

According to the standard, the typical floating point arithmetic operation may be accomplished in single precision, double precision, or extended precision format. Each of these formats utilizes a sign, exponent, and fraction field, where the respective fields occupy predefined portions of the floating point number. In addition, the extended precision format includes a mantissa field, which includes the fraction field plus an additional bit, the L bit, that is merely implied in the single- and double-precision formats.

The L bit is created by control logic when the exponent of the floating point number has a nonzero value. The L bit is written into the arithmetic registers in first bit position to the left of the fraction field of floating point numbers expressed in the extended precision format. For single- and double precision floating point numbers that have non-zero exponents, the L bit is not explicitly represented in the IEEE representation, but rather, is understood by the control logic to be present and to have a value of 1.

FIG. 1 illustrates the IEEE format for a 32-bit single precision number where the sign field is a single bit occupying the most significant bit position; the exponent field is an 8-bit quantity occupying the next-most significant bit positions; and the fraction field occupies the least significant 23 bit positions. In the case of a double precision floating point number, the sign field is a single bit occupying the most significant bit position; the exponent field is an 11-bit field occupying the next-most significant bit positions; and the fraction field is a 52-bit field occupying the least significant position. The format of the extended precision floating point number requires a single sign bit, a 15 bit exponent field, and a 64-bit mantissa field that includes the fraction and the L bit.

After each floating point intermediate arithmetic result is developed, it must be normalized and rounded if a round control bit is set. Normalization refers to the process of manipulating the exponent and fraction of an unnormalized intermediate floating point result so that the most significant binary "1" of the mantissa resides in the L bit, which is the most significant bit of the mantissa. The exponent is decremented for each 1-bit left-shift of the mantissa.

To implement the rounding rules required by ANSI/IEEE standard 754-1985, certain additional indicator bits may be set by the floating point logic during arithmetic operations. These bits generally indicate a loss of precision of a floating point number, such as might occur when an operand is right-shifted to align it for addition and one or more bits are shifted off the right side of the register. These lost precision bits are known as the "guard" bit G, a "round" bit R, and a "sticky" bit S. The G and R bits are treated as if they are a part of the fraction; they are shifted with the rest of the fraction during alignment and during normalization, and they are included in all arithmetic operations. The S bit is not shifted with the fraction but is included in the arithmetic. It acts as a "catcher" for 1's shifted off the right of the fraction. When a 1 is shifted off the right side of the fraction, the S bit will remain set until normalization and rounding are finished. Setting, interpreting, and using the G, R, and S bits to create a round control bit or a signal indicating whether or not rounding is required is well known in the art.

A typical floating point addition unit 10 is shown in FIG. 2. In the FIG. 2 addition unit 10, one of two input operands A and B may first be shifted in the Aligner 16, and then added together in the Adder 18 to produce an unnormalized intermediate result (A+B). This intermediate result is then passed to a leading zero/one detector (LZD) 20, which produces shift control signals for the normalizer 22. The normalizer 22 produces a normalized intermediate result by shifting the unnormalized mantissa result left by an amount specified by the LZD shift control signals. The exponent is decremented by one for each bit position that the mantissa is shifted to the left until the most significant bit position of the mantissa (the leading bit) becomes a one. The rounder 24 increments the normalized intermediate result, which is then typically passed to a multiplexer 26, where either the incremented result or the non-incremented result is selected to produce the final result, depending upon the ANSI/IEEE standard 754-1985 rounding scheme appropriate for the operation.

In conventional floating point addition units, as shown in FIG. 2, the arithmetic operation, leading zero/one detection, and normalization have usually been performed sequentially. This causes the latency of the execution pipeline to include the full delay of both the adder and the LZD circuits. In an effort to improve floating point performance, designers have employed various techniques to reduce the latency of the floating point execution pipeline, including predicting the location of the leading zero and/or one ("leading zero/ one anticipation," or LZA). For example, U.S. Pat. No. 4,926,369 to Hokenek et al., U.S. Pat. No. 5,493,520 to Schmookler et al., and U.S. Pat. No. 5,633,819 to Brashears et al. all describe various LZA implementations based upon the intermediate propagate and generate signals within the carry lookahead adder. U.S. Pat. No. 5,317,527 to Britton et al. describes an LZD technique that can be performed in parallel with the adder, based upon the input operands. These techniques do improve the performance of floating point units, because they eliminate the majority of the LZD delay.

The present invention is an efficient LZA method and apparatus that is implemented in three levels of N-NARY logic, and operates in parallel with but independent of the adder. The present invention generates dit-level propagate-generate-zero (PGZ) patterns and carry out signals from the input dits of the adder operands. The present invention produces a find-zero and a find-one output signal for each two-dit group of the adder result by combining PGZ patterns for the two dits within the group with the carry-out signal from the dit immediately preceding the two-dit group. Find-zero and find-one output signals for each two-dit group are then combined to produce find-one and find-zero coarse and medium shift select signals required by the normalizer.

N-NARY logic is described in a copending patent application, U.S. patent application Ser. No. 09/019,355, filed Feb. 5, 1998, now U.S. Pat. No. 6,066,965, and titled "Method and Apparatus for a N-NARY logic Circuit Using 1 of 4 Signals", (hereafter, "the N-NARY Patent"). As described in the N-NARY Patent, N-NARY logic uses a bundle of N wires routed together between different logic circuits, where information is encoded in the N wires, and where at most one and only one wire of the bundle of wires is true during an evaluation cycle. For example, a 1-of-4 N-NARY signal is a bundle of 4 wires that is capable of being encoded to represent 4 different values, and where at most, only one wire within the 4-wire bundle is true during an evaluation cycle. As explained in the N-NARY patent, a 1-of-4 N-NARY signal C, which comprises output wires $C_3$, $C_2$, $C_1$, and $C_0$, can be encoded to represent two Boolean bits A and B, as follows:

| Bit A Binary Value | Bit B Binary Value | N-Nary C decimal value | N-NARY Signal Output Wires Asserted | | | |
|---|---|---|---|---|---|---|
| | | | $C_3$ | $C_2$ | $C_1$ | $C_0$ |
| 0 | 0 | 0 | 0 | 0 | 0 | 1 |
| 0 | 1 | 1 | 0 | 0 | 1 | 0 |
| 1 | 0 | 2 | 0 | 1 | 0 | 0 |
| 1 | 1 | 3 | 1 | 0 | 0 | 0 |

The present invention is capable of functioning in parallel with, but independent of, adders such as the 32-bit N-NARY adder described in copending patent application U.S. patent application Ser. No. 09/206,463, filed Dec. 7, 1998 (07.12.98), now U.S. Pat. No. 6,269,387, entitled "Method and Apparatus for 3-stage 32-bit Adder/Subtractor" (hereafter, "the Adder Patent"), which is a carry-lookahead adder. The fast carry propagate techniques described in the Adder Patent are also used in the present invention to predict whether a carry will be generated or propagated in specific groups of bits. As described in the Adder Patent, a carry will be generated for a specific bit $S_i$ of the sum, S, when the corresponding bits of the operands, $A_i$ and $B_i$, are both 1. A carry in will be propagated across a specific bit $S_j$ of the sum S, when one and only one of the corresponding bits of the operands, $A_j$ and $B_j$, is 1. A carry in will not propagate across a specific bit $S_k$ of the sum S (it will "halt") when the corresponding bits of the operands $A_k$ and $B_k$, are both 0. In other words, $G_i = A_i$ AND $B_i$ $P_j = A_j$ XOR $B_j$ $H_k = A_k$ NOR $B_k$ In 1-of-4 N-NARY logic, where the operands and the sum are encoded at the dit-level rather than the bit-level, carries will be generated for a given dit of the sum S if that dit is greater than 3. Likewise, carries will propagate across a given dit of the sum S only if that dit equals 3, and will propagate across a block of dits only if all dits equal 3. Those unfamiliar with the workings of the conventional 32-bit N-NARY Adder, including the methodologies for resolving generate and propagate signals, are encouraged to refer to that patent for a complete understanding of the fast carry techniques described there and utilized in the present invention. In addition, the Adder Patent also provides a complete description of the "shorthand" N-NARY notation that is used herein to depict the various gates implemented in the present invention in N-NARY logic. Both the N-NARY Patent and the Adder Patent are hereby incorporated by reference into this disclosure for all purposes.

SUMMARY

The present invention is a leading zero/leading one anticipator that can operate in parallel with a floating point adder and that produces coarse and medium shift select signals for the coarse and medium shifters in the normalizer. In one embodiment, the present invention can be implemented in three levels of N-NARY logic, wherein the first logic level examines input dits of the adder operands and generates a PGZ pattern for the corresponding dit of the adder result. The first logic level also generates carry out signals that correspond to certain dit positions of the adder result. The second logic level produces a find-zero and a find-one output signal for each two-dit group of the adder result by combining PGZ patterns for the two dits within the group with the carry-out signal from the dit immediately preceding the two-dit group. Where PGZ patterns correspond to the two-dit Boolean value 0000, 1111, or 1110 and the carry-out from the prior dit is indeterminate, the present invention assumes a carry out always occurs to generate the find-one output, and assumes a carry out never occurs to generate the find-zero output. These assumptions may result in a one-bit misprediction, which can be corrected by the fine shifter in the normalizer. The third logic level combines find-zero and find-one output signals for each two-dit group of the adder result to produce a find-one coarse shift select signal, a find-zero coarse shift select signal, a plurality of find-one medium shift select signals, and a plurality of find-zero medium shift select signals.

BRIEF DESCRIPTION OF THE DRAWINGS

To further aid in understanding the invention, the attached drawings help illustrate specific features of the invention and the following is a brief description of the attached drawings:

FIGS. 9A and 9B show the potential misprediction that can result in the find-one case from treating dkcout as cout, according to one embodiment of the present invention.

FIGS. 10A and 10B show the potential misprediction that can result in the find-zero case from treating dkcout as ncout, according to one embodiment of the present invention.

DETAILED DESCRIPTION OF THE INVENTION

The present invention is a leading zero/leading one anticipator that can operate in parallel with a floating point adder and that produces coarse and medium shift select signals for the coarse and medium shifters in the normalizer. In one embodiment, the present invention can be implemented in three levels of N-NARY logic, wherein the first logic level examines input dits of the adder operands and generates a propagate-generate-zero (PGZ) pattern for the corresponding dit of the adder result. The first logic level also generates carry out signals that correspond to certain dit positions of the adder result. The second logic level produces a find-zero and a find-one output signal for each two-dit group of the adder result by combining PGZ patterns for the two dits within the group with the carry-out signal from the dit immediately preceding the two-dit group. The third logic level combines find-zero and find-one output signals for each two-dit group of the adder result to produce find-one and find-zero coarse and medium shift select signals. This disclosure describes numerous specific details that include specific structures, circuits, and logic functions in order to provide a thorough understanding of the present invention. One skilled in the art will appreciate that one may practice the present invention without these specific details. In addition, structures that are well known in the art are not described in detail to avoid obscuring the present invention.

Figure 1:
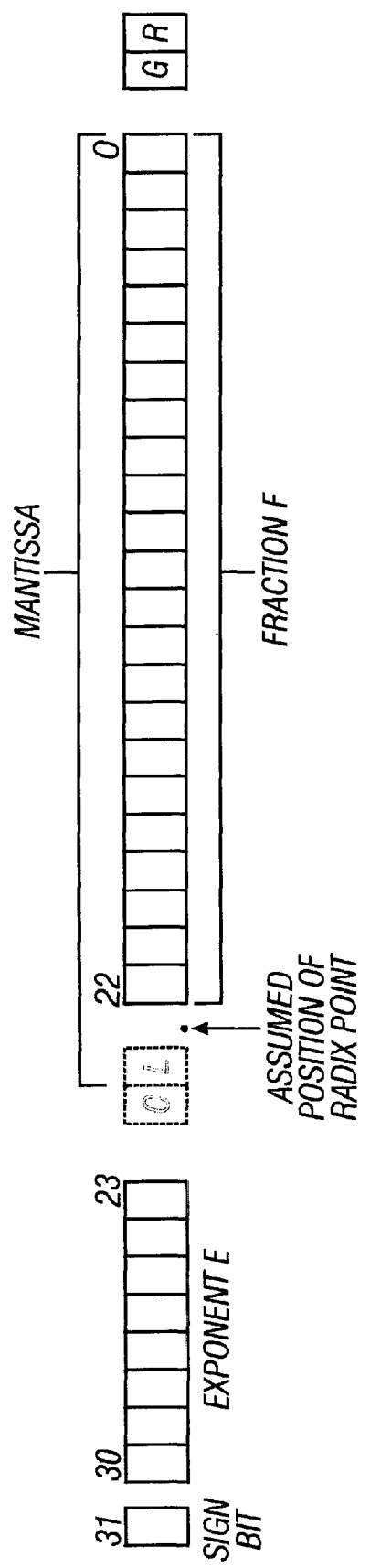
FIG. 1 illustrates the ANSI/IEEE 754-1985 standard bit format for representing a normalized single precision floating point number.
Figures 2, 3:
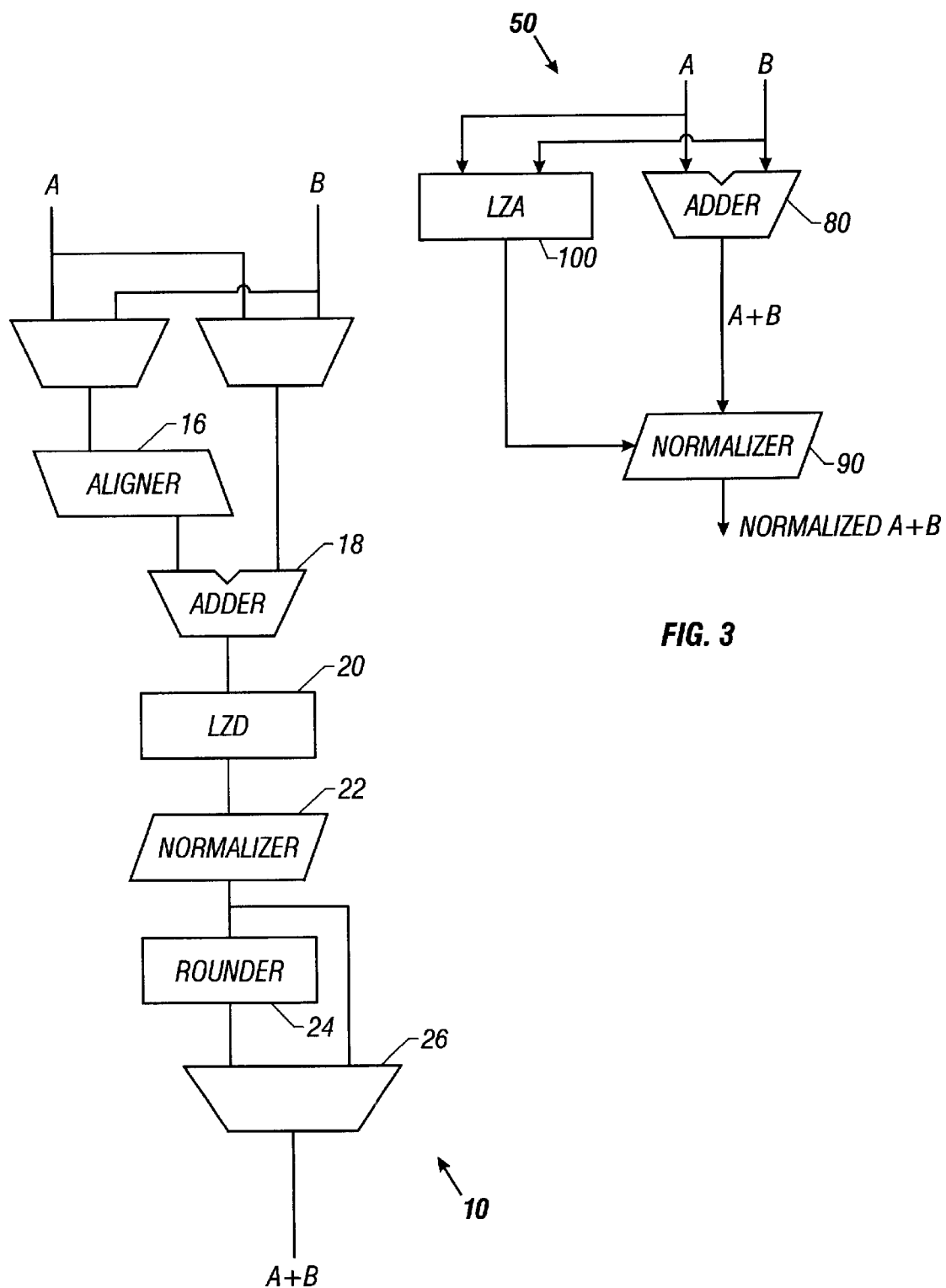
FIG. 2 is a block diagram of a typical floating point execution unit.
FIG. 3 is a high-level block representation of a floating point execution unit that includes the LZA of the present invention.
Figure 4:
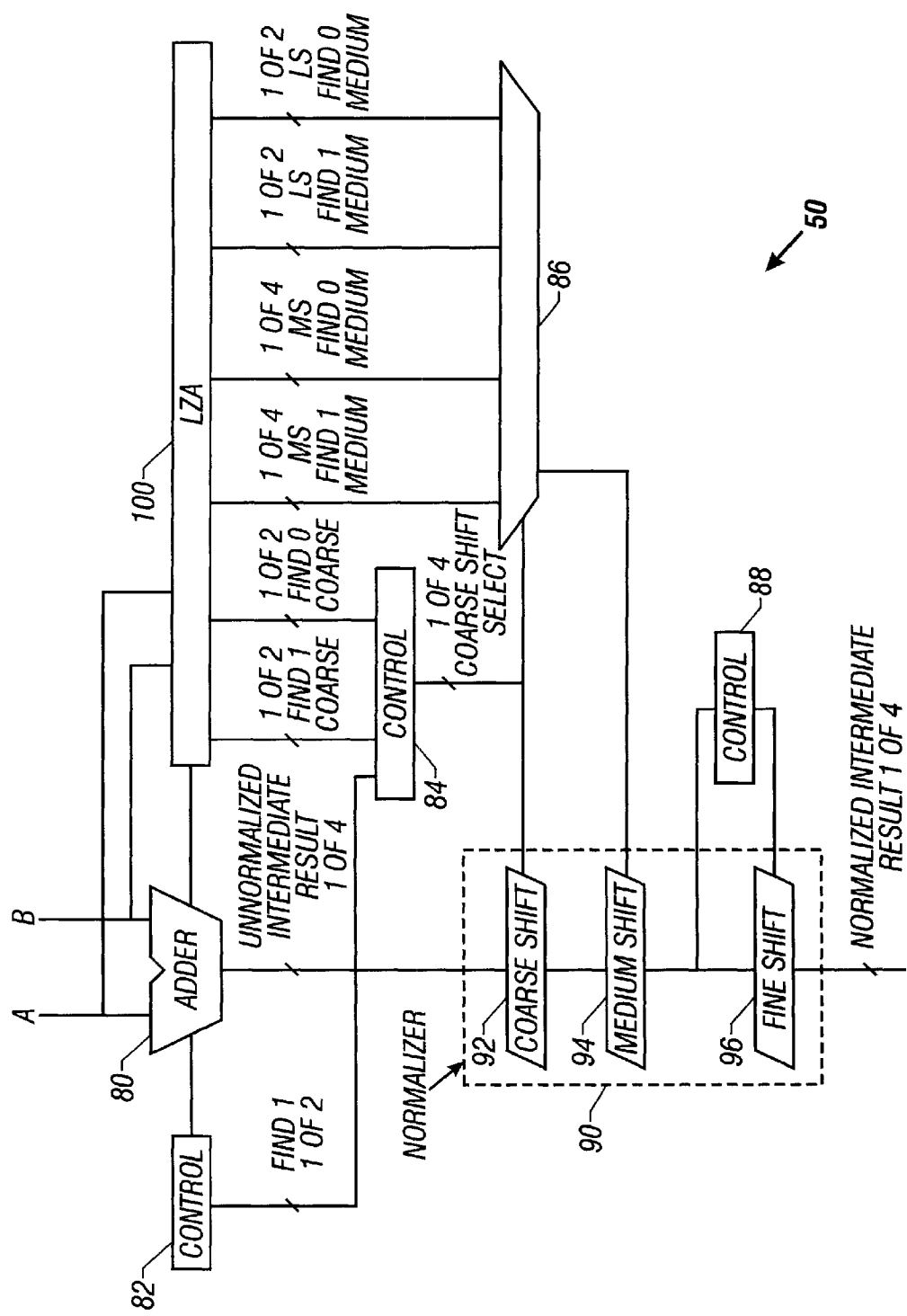
FIG. 4 shows the floating point execution unit of FIG. 3, including the interface between the input operands, the LZA of the present invention, and the normalizer.

FIG. 3 shows a high-level block diagram of a typical floating point unit 50 that includes an adder 80, a normalizer 90, and the LZA 100 of the present invention. FIG. 4 shows the same floating point unit 50, with further details that include the interface of the LZA 100 with the input operands A and B. As shown in FIG. 4, a typical floating point unit 50 that includes the LZA 100 of the present invention includes control circuitry 82 and 84, and multiplexer 86. As discussed in further detail below, the functions of control circuitry 82 and 84 primarily relate to selecting which of the outputs of the LZA 100 will be used. In addition, as shown in FIG. 4, the coarse shift select output of control circuit 84 is provided to multiplexer 86, in which the proper medium shift select signal output from the LZA 100 is selected and sent to the medium shifter 94 in the normalizer 90.

Control circuit 88 and fine shifter 96 are shown in FIG. 4 for completeness only; the LZA 100 of the present invention does not affect the operation of these typical elements of a floating point pipeline. Those skilled in the art will understand that normalizer 90 shown in FIG. 4 is a typical normalizer well known in the art, comprising a series of multiplexers that perform coarse, medium, and fine shifting, respectively, of the unnormalized intermediate mantissa to achieve a normalized intermediate result.

For example, in the typical normalizer 90 operating on a single precision intermediate result, the coarse shifter 92 might shift a single precision intermediate result mantissa 0 or 16 bits, depending upon the value of the coarse shift select signal. The medium shifter 94 may shift the coarse shifter output an additional 0, 4, 8, or 12 bits, as selected by the medium shift select signal generated by the multiplexer 86 from the outputs of the LZA 100. The fine shifter 96 may shift the medium shifter output an additional 0 to 4 bits, as selected by the fine shift select signal produced by control circuitry 88. The output of the fine shifter 96 is a normalized intermediate result, which is then available for rounding in units where rounding is performed sequentially. In units where rounding is performed in parallel with normalization, the output of the fine shifter is provided to a final multiplexer (not shown in FIG. 4) which selects either the normalizer output or the rounder output as the final, normalized result of the operation.

In the preferred embodiment of the present invention described herein, the LZA 100 is implemented in three levels of N-NARY logic and uses fast carry propagate resolution methods applied to the input operands A and B to anticipate the location of the leading zeros and leading ones in specific bit groups of the result from the adder. The preferred embodiment of the LZA is described herein in the context of a floating point unit performing a single precision addition/subtraction operation. However, after reading this disclosure and/or practicing the present invention, one skilled in the art will recognize that the methods, techniques, and structures detailed herein are extendable to accommodate double- and extended-precision addition/subtraction operations Those skilled in the art will appreciate that in many floating point implementations, the operands are pre-normalized. In this case, effective add and multiplication operations will produce an intermediate mantissa result in the format 01.XX...XX or 1X.XX...XX, neither of which requires normalization. Therefore, the intermediate mantissa result of an operation that uses pre-normalized operands performed in a floating point unit such as that shown in FIG. 2 will require normalization only if the arithmetic operation that produced the intermediate result was an effective subtract operation, defined by the equation $$\text{effective\_subtract} = (Sa \text{ XOR } Sb) \text{ XOR } Si$$

where
  $Sa=1$ if operand A is negative, else $Sa=0$;
  $Sb=1$ if operand B is negative, else $Sb=0$;
  $Si=1$ if the instruction executing the operation is a subtract, else $Si=0$.

As defined by this equation, if one of the operands is negative AND the instruction is not a subtract, an effective subtract is being performed. Alternatively, if both operands are either positive or both are negative, and the instruction is a subtract, an effective subtract is being performed. In each of these cases, normalization may be required, and the LZA 100 of the present invention must predict the location of the leading one (find-one case) or the leading zero (find-zero case) of the intermediate result in order to provide the proper shift signals to the normalizer 90.

The find-zero case is used only in effective subtract operations where the exponents of the two operands are equal, and the absolute value of the mantissa assumed by the floating point addition unit to be the smaller of the two mantissas is actually the larger. This case is detected when there is no carry out from the adder after performing the effective subtract operation, and indicates that the intermediate result must be inverted before or during normalization to achieve a proper signed magnitude result. These functions (detect effective subtract operation, check for adder carry out, and select coarse shift find-zero or coarse shift find-one LZA output) are performed by the control circuitry 82 of FIG. 4. The output of control circuitry 82 is a 1-of-2 N-NARY signal where a value of 0 indicates that the find-zero case should be used in the normalizer, and a value of 1 indicates that the find-one case should be used in the normalizer.

As shown in FIG. 4, the output of control circuitry 82 is an input to control circuitry 84, along with the two 1-of-2 coarse find-one and find-zero signals from the LZA 100. Control circuitry generates a 1-of-4 N-NARY coarse shift select signal, which controls the coarse shifter 92 in the normalizer. In one embodiment suitable for single precision results, the output of control circuitry 84 is defined by Table 1 below.

TABLE 1

1-of-4 Coarse Shift Select Signal Values for Single Precision Subtract Operations

| Coarse Shift Select Signal Value | Corresponds to | Comments |
| --- | --- | --- |
| 0 | Shift 0-bits | Find-one case; leading 1 predicted in most significant 16 bits |
| 1 | Shift 16-bits | Find-one case; no leading 1 predicted in most significant 16 bits |
| 2 | Shift 0-bits and invert | Find-zero case; leading 0 predicted in most significant 16 bits |
| 3 | Shift 16-bits and invert | Find-zero case; no leading 0 predicted in most significant 16 bits |

Those familiar with N-NARY logic will appreciate that the above design approach could be applied to generate one or more N-NARY coarse shift control signals suitable for coarse shifting the intermediate result of a double precision or extended-precision subtract operation. For example, the output of control circuitry 84 could be a 1-of-6 signal where the additional two values could represent shift-32 bits and shift-32 bits and invert. Alternatively, control circuitry 84 could generate two outputs selectable by the value of the 1-of-2 output of control circuit 82: a 1-of-4 find-one case having values that correspond to shift-0, shift-16, shift-32, and shift-48, and a 1-of-4 find-zero case having values that correspond to invert and shift-0, -16, -32, and -48. As these examples illustrate, one skilled in the art will understand that the present invention is not limited to the single precision embodiment described in this disclosure.

Figure 5:
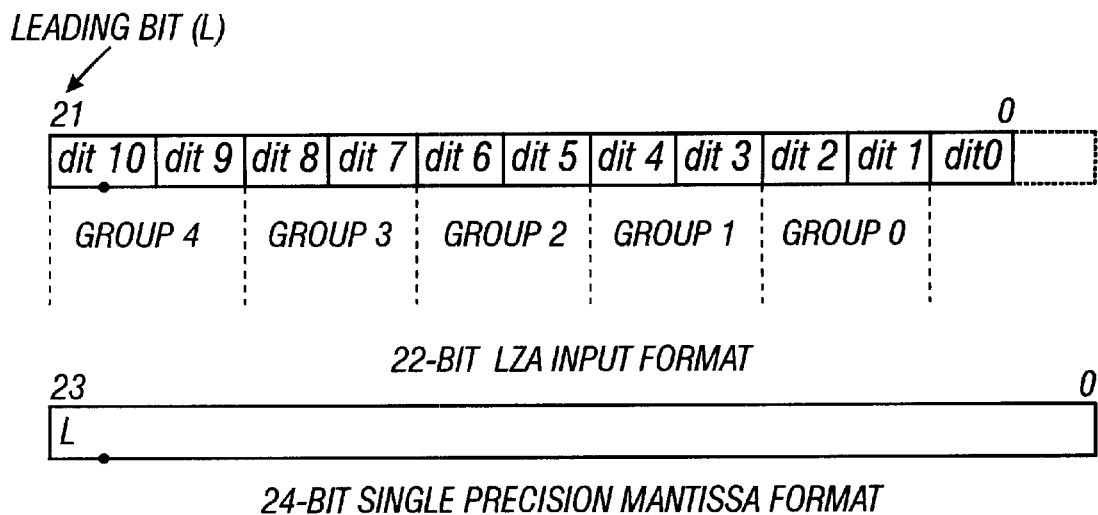
FIG. 5 shows the division of a single precision mantissa into dits and dit groups for processing by the LZA of the present invention.

FIG. 5 shows how a 24-bit single precision mantissa is divided into dits and dit groups for processing by the LZA 100. The value of each dit of each operand is encoded in a 1-of-4 N-NARY input signal to the LZA 100. As explained in further detail below, the LZA generates "PGZ" patterns (representing propagate, generate, or zero) for dits and dit groups, and then combines those patterns to make predictions about the location of the leading one or the leading zero in various groups within the intermediate result. As shown in FIG. 5, the LZA analyzes only the top 22 bit positions of the single precision operation intermediate result to produce coarse and medium shift selects. When the leading one or leading zero appears in the bottom dit of a single precision intermediate result, it is properly shifted into the L bit position by the fine shifter in the normalizer, after coarse and medium shifting controlled by the LZA.

FIG. 5 shows that for single precision operands and results, the most significant 22 bits are divided into 11 dits (dits 10 through 0) that comprise four two-dit groups labeled group 4 through group 0.

Table 2 shows a sample PGZ pattern generated by the LZA for example result dits, as a function of the corresponding input operand dits.

Table 2. PGZ patterns generated for example input dits

TABLE 2

PGZ patterns generated for example input dits

| $A_n$ Decimal Value | Boolean | $B_n$ Decimal Value | Boolean | $S_n$ | Boolean | PGZ pattern |
| --- | --- | --- | --- | --- | --- | --- |
| 0 | 00 | 0 | 00 | 0 | 00 | ZZ |
| 1 | 01 | 0 | 00 | 1 | 01 | ZP |
| 2 | 10 | 1 | 01 | 3 | 11 | PP |
| 3 | 11 | 1 | 01 | 0* | 00* | PG |
| 0 | 00 | 2 | 10 | 2 | 10 | PZ |
| 1 | 01 | 2 | 10 | 3 | 11 | PP |
| 2 | 10 | 3 | 11 | 1* | 01* | GP |
| 3 | 11 | 3 | 11 | 2* | 10* | GG |

In Table 2, a * indicates that conceptually, a carry out has been generated by the operation.

Table 2 illustrates that the LZA generates a P, G, or Z for each bit position i within a given dit $S_n$ according to the following relationships:

$G_i = A_i$ AND $B_i$ $P_i = A_i$ XOR $B_i$ $Z_i = A_i$ NOR $B_i$

PGZ patterns for each dit are then combined into patterns for 2-dit groups, which are then examined relative to each other to form coarse and medium shift select signals for the find-one and find-zero cases.

Find-1 Case

For a given 2-dit group, a one is predicted within that group unless one of the following combinations occurs:

(1) PPPP*
(2) PPPG
(3) PPGZ
(4) PGZZ
(5) GZZZ
(6) ZZZZ where a "*" preceding a 2-dit group indicates a carry in.

Table 3 shows 2-dit groups (labeled group k) that create a problem for the find-one case because they may generate a carry out and affect the next 2-dit group to the left (labeled group j), by forcing a one in a group that would otherwise not include a one.

TABLE 3

| group j | group k |
|---------|---------|
| XXXX | PPPP |
| XXXX | PPPG |
| XXXX | PPGX |
| XXXX | PGXX |
| XXXX | GXXX |

In Table 3, X can be P, G or Z.

The five 2-dit groups included in group k are the only possible groups that may generate a carry out. The top group (PPPP) may or may not generate a carry out, depending on the carry in. The bottom four groups (PPPG, PPGX, PGXX and GXXX) always generate a carry out, regardless of the carry in.

By assuming a carry in to group j occurs if the two most significant PGZ values in group k are PP, PG, or GX, the potential carry out from group k can be accounted for in group j. This can create a single bit misprediction, (i.e., where group k was PPPP but there was no carry in to group k). This single bit misprediction can be recovered by the fine shifter in the normalizer.

Two PGZ pattern combinations for a given A/B adder input pair that could potentially create a problem are:

(a) PPPP PPPP .... PPPP PPPP
(b) ZZZZ ZZZZ .... ZZZZ ZZZZ

In (a) it may be difficult to locate the leading one, and in (b) a leading one does not exist. However, neither of the above combinations can be achieved when there is a carry out from the adder result. Therefore, these two combinations are not relevant to the find-one implementation described.

Find-zero Case

For a given 2-dit group, a zero is predicted within that group unless one of the following combinations occurs:

(1) PPPP
(2) PPPZ*
(3) PPZG*
(4) PZGG*
(5) ZGGG*
(6) GGGG* where a "*" preceding a 2-dit group indicates a carry in.

Table 4 shows 2-dit groups (labeled group v) that create a problem for the find-zero case because they may not generate a carry out. When there is no carry out from group v, the next 2-dit group to the left (labeled group u) may be affected, because a zero will appear in a group that would otherwise not include a zero when there is a carry in to that group.

TABLE 4

| group u | group v |
|---------|---------|
| XXXX | PPPP |
| XXXX | PPPZ |
| XXXX | PPZX |
| XXXX | PZXX |
| XXXX | ZXXX |

In Table 4, X can be P, G or Z. The five 2-dit groups included in group v are the only possible groups that may not generate a carry out. The top group (PPPP) may or may not generate a carry out, depending on the carry in. The bottom four groups (PPPZ, PPZX, PZXX and ZXXX) never generate a carry out, regardless of the carry in. By assuming that no carry in to group u occurs if the two most significant PGZ values in group v are PP, PZ, or ZX, the potential lack of a carry out from group v can be accounted for in group u. This assumption can create a single bit misprediction (i.e., where group v was PPPP and there was a carry in to group v), which can be recovered by the fine shifter in the normalizer.

Two combinations detected for a given A/B adder input pair that could potentially create a problem are:

(a) PPPPPPPP .... PPPPPPPP
(b) GGG GGGG .... GGGG GGGG

In (a) a leading zero does not exist, and in (b) a leading zero does not exist if there is a carry in to the LSB. Because (b) will result in a carry out from the adder it is not relevant to the find-zero implementation described.

For all 2-dit groups to be PPPP, the source mantissas must be equal. If the subtrahend is inverted to perform the effective subtract, the subtrahend will become the inversion of the minuend, and the LZA will generate a PPPP for all 2-dit groups. If the exponents of the operands are equal, and the mantissas are also equal, then operation being performed is x−x=0 or −x+x=0. In this case, any combination of normalizer shift amounts produced by the LZA will be acceptable, because any normalization shift amount will result in a normalizer output of 0 (since during the left shift, zeros are shifted in on the right).

The LZA performs operand examination, result pattern generation, and find-one/find-zero functions in three logic levels, as described below.

Level One Logic

Level One of the LZA produces PGZ information and carry out information on a dit basis. Table 5 is a Level One truth table showing the dit-level PGZ pattern generated by Level One as a function of the value of the corresponding input dits A and B. Table 5 also shows the carry out output, a 1-of-3 signal that encodes carry out information for the sum dit. As shown in Table 5, the Level One logic determines, given a pair of input dits, whether there absolutely will, absolutely will not, or could be a carry out to the N+1th dit when the inputs are summed. In Table 5, "no cout" indicates that, given the values of the Nth dit of the operands A and B, there will never be a carry out of the corresponding Nth dit of the adder output, regardless of whether there is a carry in from the N−1th dit. Similarly, "cout" indicates that there will always be a carry out of the Nth dit, regardless of whether there is a carry in from the N−1th dit. Finally, "don't know" indicates that the carry out is indeterminate, i.e., that the existence of a carry out of the Nth dit of the adder output depends upon whether there is a carry in from the N−1th dit.

TABLE 5

Level One PGZ Pattern and Carry Out Outputs

| Dit N of A Input (1-of-4) | Dit N of B Input (1-of-4) | Dit N of sum (1-of-4) | Level One Dit N PGZ pattern | Level One Dit N carry out output (1-of-3) |
|---|---|---|---|---|
| 00 | 00 | 00 | ZZ | no cout |
| 00 | 01 | 01 | ZP | no cout |
| 00 | 10 | 10 | PZ | no cout |
| 00 | 11 | 11 | PP | don't know |

TABLE 5-continued

Level One PGZ Pattern and Carry Out Outputs

| Dit N of A Input (1-of-4) | Dit N of B Input (1-of-4) | Dit N of sum (1-of-4) | Level One Dit N PGZ pattern | Level One Dit N carry out output (1-of-3) |
|---|---|---|---|---|
| 01 | 00 | 01 | ZP | no cout |
| 01 | 01 | 10 | ZG | no cout |
| 01 | 10 | 11 | PP | don't know |
| 01 | 11 | 00 | PG | cout |
| 10 | 00 | 10 | PZ | no cout |
| 10 | 01 | 11 | PP | don't know |
| 10 | 10 | 00 | GZ | cout |
| 10 | 11 | 01 | GP | cout |
| 11 | 00 | 11 | PP | don't know |
| 11 | 01 | 00 | PG | cout |
| 11 | 10 | 01 | GP | cout |
| 11 | 11 | 10 | GG | cout |

There are theoretically nine possible PGZ outputs for each dit (PP, PG, PZ, GP, GG, GZ, ZP, ZG, and ZZ), all of which are shown in Table 5. However, the number of PGZ outputs that are relevant to the present invention can be reduced to six, by collapsing some of the PGZ combinations together when the logic is the same for either combination.

For example, as described above in the find-one case, the present invention handles the PG combination the same as the GZ combination. In both combinations, there is no "1" present in the output dit unless there is a carry in. Similarly, the present invention handles the PZ combination the same as the ZG combination. As described above in the find-zero case, the PZ and ZG combinations will always include a "0" unless there is a carry in from the prior dit. Finally, the ZP and GP combinations can be handled the same by the present invention because both combinations always have both a "0" and a "1," regardless of whether there is a carry in or not. Therefore, to simplify, the PG/GZ combinations can be renamed "XY," the PZ/ZG combinations can be renamed "WV", and the ZP/GP combinations can be renamed "fboth" (for "found both"). Table 6 is identical to Table 5, except that the PG, GZ, PZ, ZG, ZP, and GP combinations have been replaced by "XY," "WV," and "fboth," in accordance with the prior discussion.

TABLE 6

Level One PGZ and Carry Out Outputs

| Dit N of A Input (1-of-4) | Dit N of B Input (1-of-4) | Dit N of sum (1-of-4) | Level One Dit N PGZ output (1-of-6) | Level One Dit N carry out output (1-of-3) |
|---|---|---|---|---|
| 00 | 00 | 00 | ZZ | no cout |
| 00 | 01 | 01 | fboth | no cout |
| 00 | 10 | 10 | WV | no cout |
| 00 | 11 | 11 | PP | don't know |
| 01 | 00 | 01 | fboth | no cout |
| 01 | 01 | 10 | WV | no cout |
| 01 | 10 | 11 | PP | don't know |
| 01 | 11 | 00 | XY | cout |
| 10 | 00 | 10 | WV | no cout |
| 10 | 01 | 11 | PP | don't know |
| 10 | 10 | 00 | XY | cout |
| 10 | 11 | 01 | fboth | cout |
| 11 | 00 | 11 | PP | don't know |
| 11 | 01 | 00 | XY | cout |
| 11 | 10 | 01 | fboth | cout |
| 11 | 11 | 10 | GG | cout |

Table 6 shows that the only combinations that are relevant to the present invention are PP, GG, ZZ, XY, WV, and fboth. Therefore, the Level One PGZ output signal is a 1-of-6 N-NARY signal encoded to represent these six combinations. The Level One carry out output signal is a 1-of-3 signal encoded to represent the three carry out possibilities shown in Tables 5 and 6: cout, ncout, and dkcout (carry out, no carry out, and don't know carry out, respectively).

As described in the above discussion of the present invention's implementation of the find-one and find-zero cases, while PGZ pattern information is required for each dit, carry out information is only required for 2-dit blocks. More specifically, carry out information is only required for the most significant dit in each 2-dit block. Therefore, the Level One logic generates a PGZ output that corresponds to each dit position of the adder output except for dit position 0 (see FIG. 5). The Level One logic generates a carry out output for dit positions 8, 6, 4, 2, and 0.

Figure 6:
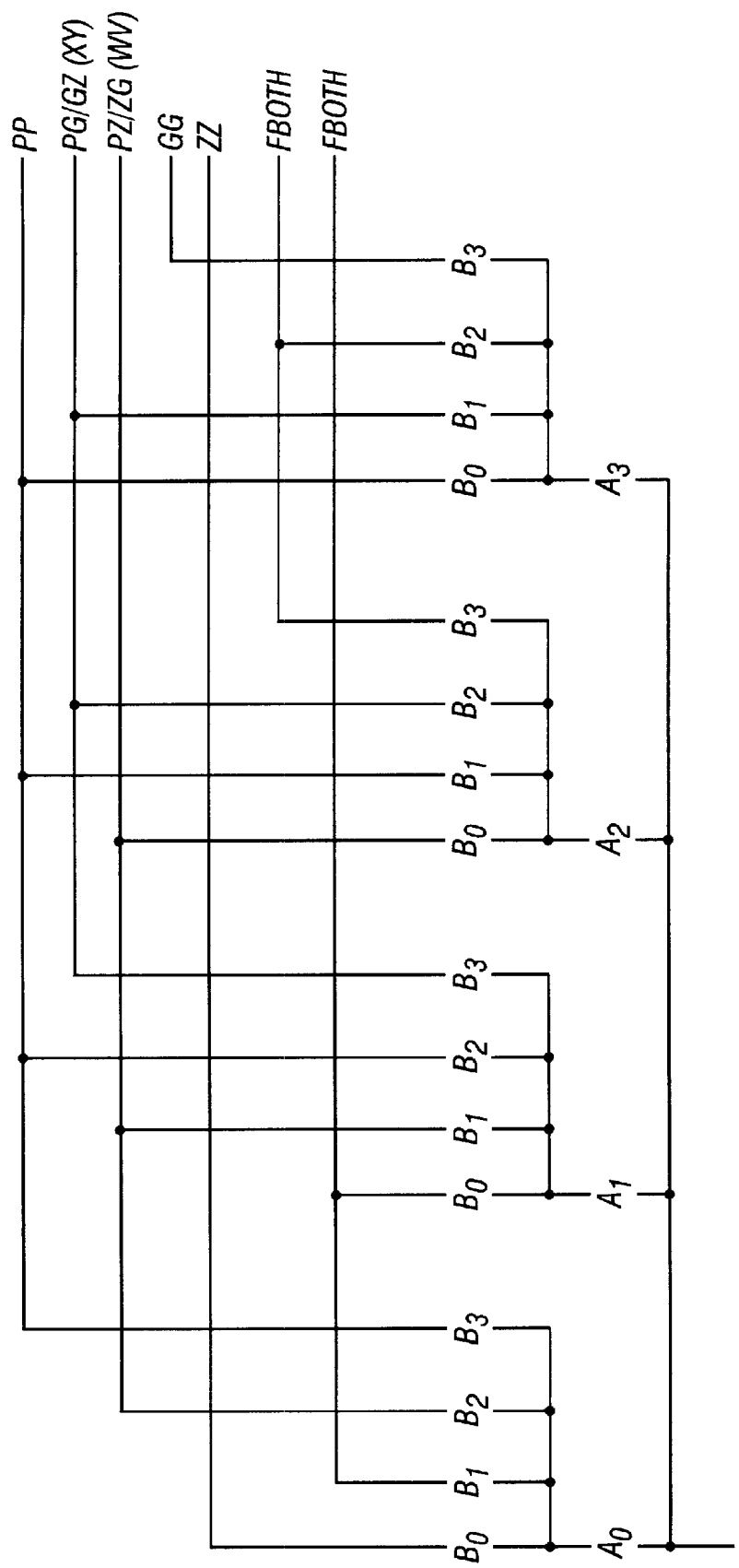
FIG. 6 shows a shorthand representation of a Level One gate that generates a PGZ output signal for the result dit that corresponds to the input dit of input operands A and B, according to one embodiment of the present invention.
Figure 7:
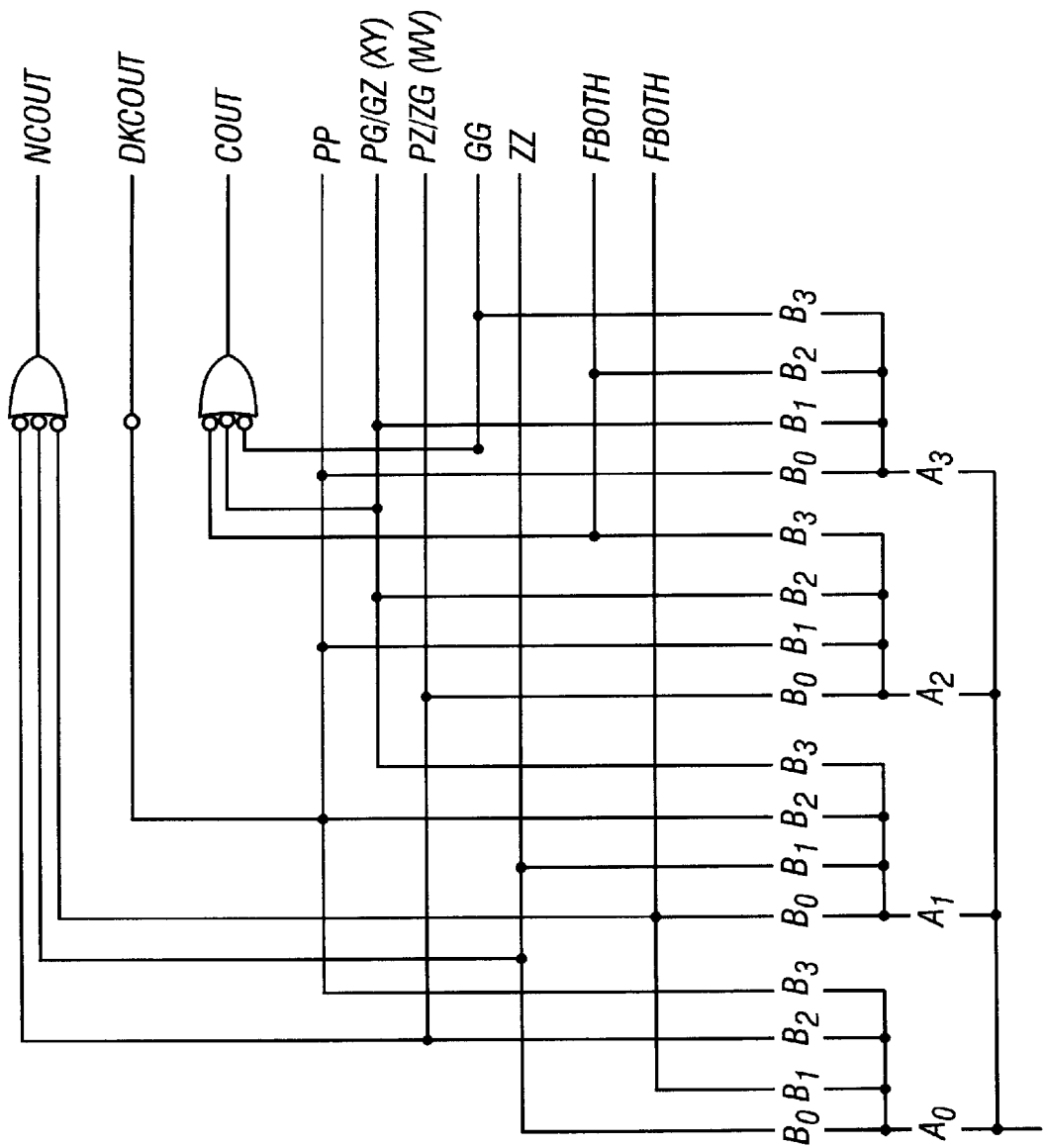
FIG. 7 shows the FIG. 6 gate with the additional connections required to generate a carry out output signal for the result dit position.

FIG. 6 shows one embodiment of a Level One gate that accepts two 1-of-4 input signals A and B that represent dits of the input operands A and B, and generates a 1-of-6 output signal that encodes the appropriate PGZ pattern for the corresponding dit position of the adder output. FIG. 7 shows the same gate, with the additional connections required to generate the 1-of-3 carry out output signal for the corresponding dit position. In one embodiment of the present invention implementing leading zero/leading one anticipation in a single precision floating point operation, the PGZ pattern for dits 10, 9, 7, 5, 3, and 1 might be generated using the gate shown in FIG. 6; while the PGZ pattern and carry out for dits 8, 6, 4, and 2 might be generated using the gate shown in FIG. 7. The FIG. 7 gate could also be used to generate the carry out information for dit 0. As discussed above, the present invention does not use or generate or PGZ information for dit 0 since that information is not required for coarse and medium shifting in the normalizer.

Level Two Logic

Figure 8A:
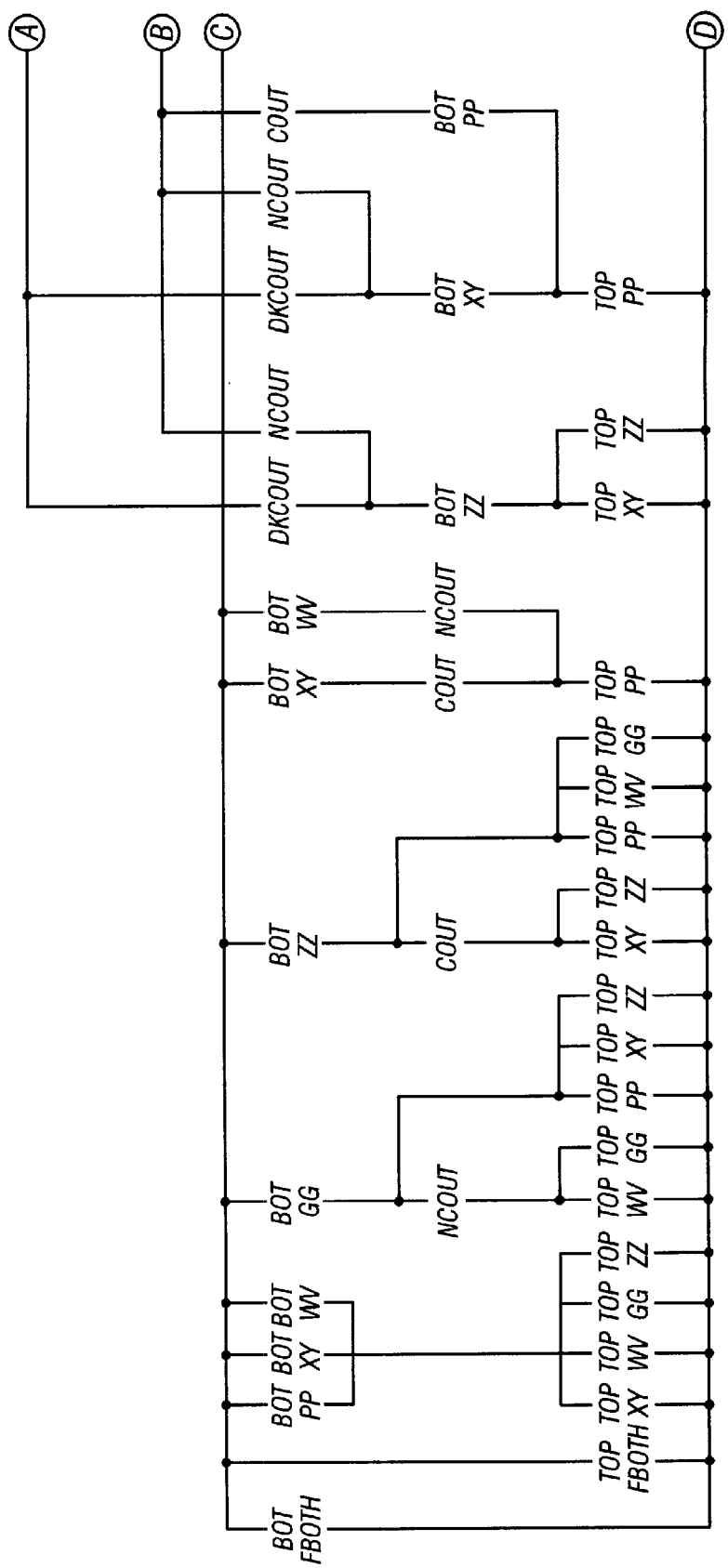
FIGS. 8A, 8B, and 8C show a shorthand representation of a Level Two gate that generates find-one and find-zero information for a two-dit group, according to one embodiment of the present invention.
Figure 8B:
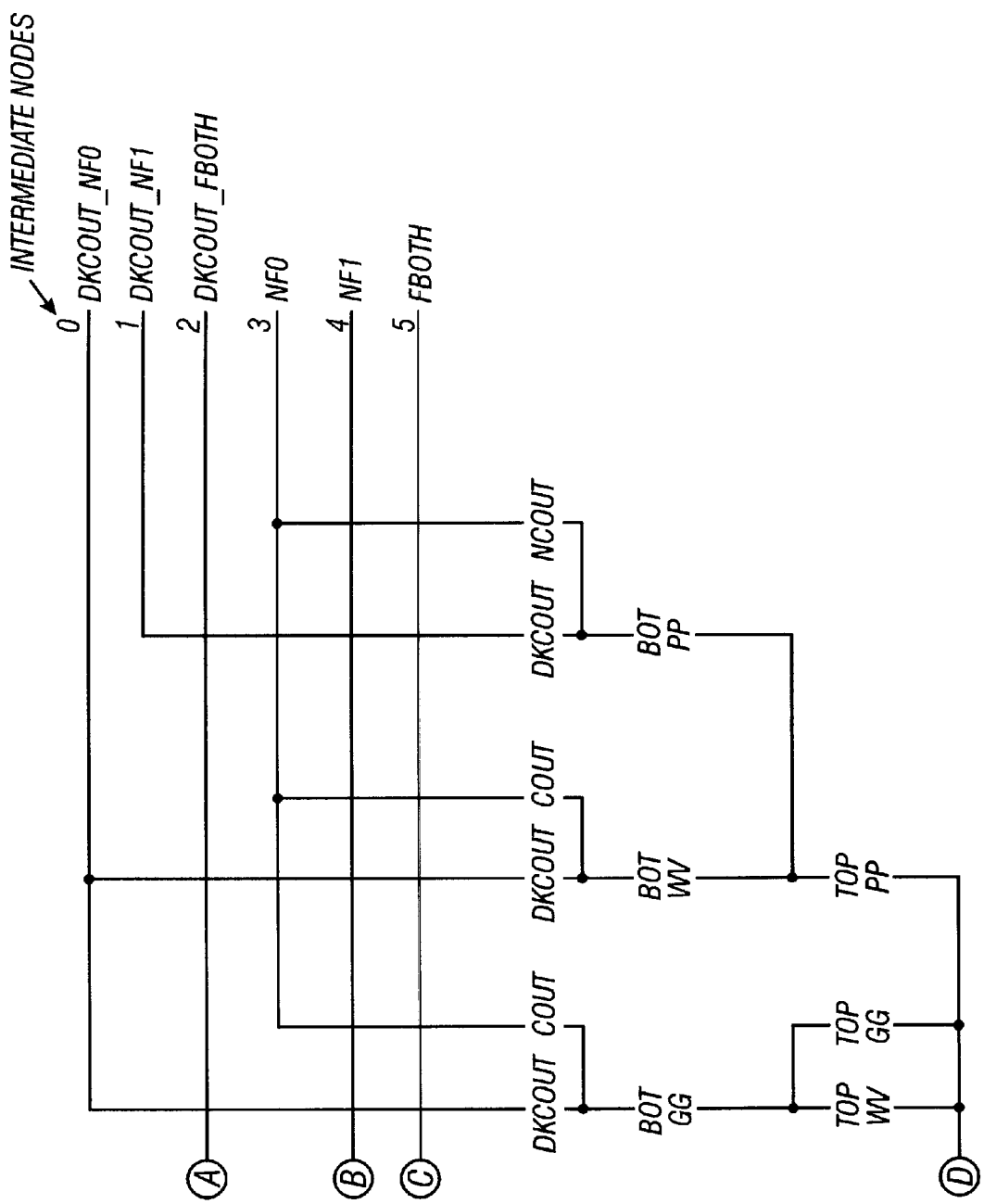
Figure 8C:
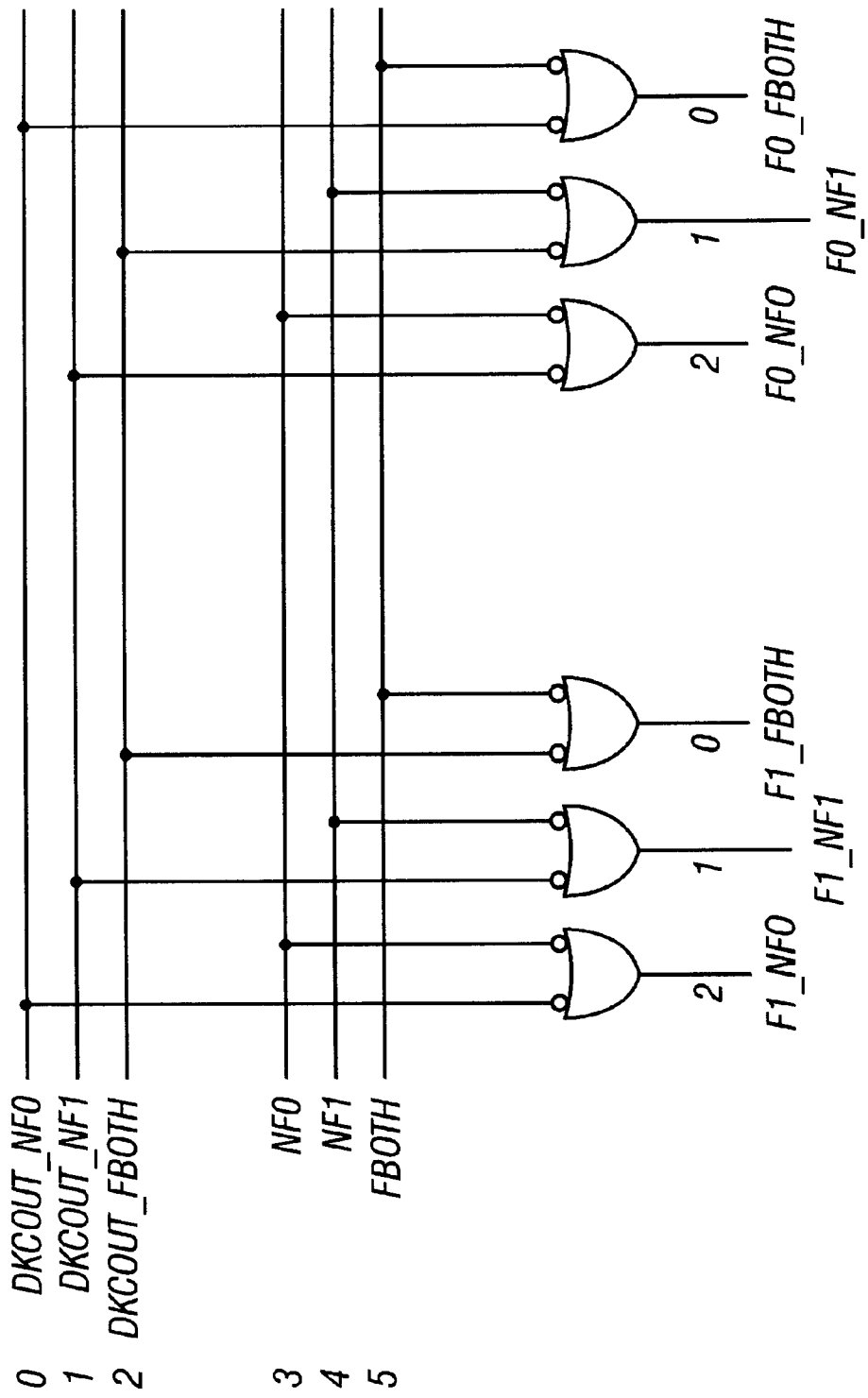

In Level Two, PGZ information from two adjacent dits (N+1 and N) is combined with carry out information from the adjacent (N−1)th dit to form find-zero and find-one information for each 4 bit group. There are five 4 bit groups for single precision inputs (20 bits total). Level One information is combined to produce, for each 4-bit group, a find-zero 1-of-3 signal and a find-one 1-of-3 signal, each having the possible values of "fboth", "nf1" or "nf0" (corresponding to "found both a 0 and a 1 within the group", "not found 1", and "not found 0", respectively). FIGS. 8A, 8B, and 8C show one embodiment of a Level Two gate that performs both the find-one function and the find-zero function. FIGS. 8A and 8B show the gate and its intermediate evaluate nodes, labeled 0 through 5 on FIG. 8B. FIG. 8C shows how the intermediate evaluate nodes are then combined to form the gate outputs. In the discussion below, the gate depicted in FIGS. 8A, 8B, and 8C is referred to as a "FIG. 8 gate."

In a single precision implementation of the present invention, there are five FIG. 8 gates, one for each 2-dit group of the single precision result. Each gate receives two PGZ output signals generated from Level One, one for the top dit of the group and one for the bottom dit of the group, plus the 1-of-3 carry out signal generated in Level One for the top dit of the previous group. For clarity in analyzing this gate, the PGZ input signals are shown in FIGS. 8A and 8B as "top AA" and "bottom BB," where "top" indicates that the input signal is the PGZ signal corresponding to the top dit of the group, "bottom" indicates the PGZ signal corresponding to the bottom dit of the group, and "AA" and "BB" correspond to the six possible PGZ combinations that may be encoded in the 1-of-6 PGZ signal for each dit. In FIGS. 8A and 8B, "cout", "ncout", and "dkcout" correspond to the possible values of the 1-of-3 carry out signal generated by Level One for the top dit of the previous group.

Table 8 below is a truth table that lists the outputs of the FIG. 8 gate as a function of the values of the input PGZ and carry out signals. To understand how the gate works, however, it is first necessary to address how the "dkcout" input is handled by the find-one and find-zero logic of the gate.

In generating the find-zero and find-one output for a two-dit group, there are certain cases where the carry in to the group (the carry out from the prior dit) affects the result. For example, a carry in to a two-dit group comprising a "PPPP" pattern should result in a "nf1" ("not found 1") output, because the carry in will propagate through the group, creating a two-dit Boolean value of 0000. If there is no carry in to a PPPP group, the correct output for the group should be "nf0" ("not found 0") because the two-dit Boolean value for a PPPP group with no carry in is 1111. This sensitivity to the carry in of certain patterns can create a problem in generating find-zero and find-one outputs, absent the following assumptions made by the present invention.

In generating the outputs for the find-one case for patterns where the find-one result is affected by the carry in, the FIG. 8 gate treats an indeterminate carry out (dkcout asserted) as though there is always a carry out (i.e., the gate assumes that there is always a carry in to the group). This creates a single bit misprediction when, in the actual result of the addition operation, no carry out occurs.

To illustrate how this happens, note from Tables 5 and 6 that the existence of a carry out of dit N is only uncertain when the dit PGZ pattern is PP, corresponding to a dit value of "11." The find-one case always assumes a carry out occurs in a "PP" dit that is the most significant dit in a 2-dit group. If there is a carry out of that dit (because when the operation is performed, there is a carry in) then the assumption was correct and there is no misprediction. If there is not actually a carry out (because there is no carry in), then the LZA might erroneously predict that a "1" appears in the two-dit group immediately to the left of dit N. While this would be an error, it is an error of only one bit position, because the most significant bit of dit N will have a value of "1." Therefore, if this error occurs, the fine shifter of the normalizer will correct by shifting the mantissa an additional one bit position to the left.

If a misprediction occurs as a result of treating an indeterminate carry out as an affirmative carry out in the Level Two find-one logic, it must only be corrected when the "PP" dit of the sum that created the misprediction actually contains the leading one of the mantissa. FIGS. 9A and 9B show the PGZ pattern that is generated by the LZA for two pairs of single precision operands A and B (FIG. 9A) and C and D (FIG. 9B). Using the group- and dit-numbering convention described in FIG. 5, note that in FIG. 9A, there is a "PP" dit in dit position 6, the most significant dit of group 2. The Level Two find-one logic will erroneously assume that a carry out of dit 6 occurs, resulting in an erroneous "fboth" prediction for group 3 in FIG. 9A. However, because the leading one in the FIG. 9A mantissa is correctly predicted to be located in group 4, no correction of the group 3 misprediction is required for proper normalization of the FIG. 9A intermediate result.

This is not the case in FIG. 9B. In FIG. 9B, the group 4 misprediction that results from the carry out assumption relating to the "PP" dit 8 causes a misprediction of the group location of the leading one in the mantissa. When this occurs, the actual leading one of the mantissa will always be in the most significant bit of the next group. Therefore, as these examples illustrate, any error caused by handling "dkcout" as a "cout" in the find-one logic will always be on the conservative side—the mantissa will never be "overshifted," and the fine shifter can correct the error by shifting the mantissa an additional bit location.

Conversely, generating the outputs for the find-zero case for patterns where the find-zero result tis affected by the carry in, the Level Two gate treats an indeterminate carry out as though there is no carry out from the top bit of the prior group. This can create a single bit misprediction when, in the actual result of the addition operation, there is a carry in to the "PP" dit that creates a carry out from that dit. As in the prior case, the misprediction has no effect when the "PP" dit that created the misprediction does not contain the leading zero, as shown in FIG. 10A. When the "PP" dit that creates the misprediction does contain the leading zero of the mantissa, as shown in FIG. 10B, the present invention may mispredict a zero in the 4-bit group immediately to the left of the "PP" dit, which must then be corrected by the fine shifter in the normalizer.

With this understanding of how indeterminate carry outs are handled for certain patterns by the find-one and find-zero cases, the creation of the gate outputs in FIG. 8C becomes clear. Table 7 shows the conditions under which intermediate nodes 0, 1, and 2 in FIG. 8B are high.

TABLE 7

Conditions Under Which FIG. 8B Intermediate Nodes are Asserted

| Intermediate Node Asserted | Top dit/ Bottom dit | Corresponding possible PGZ patterns for group | Corresponding Boolean for group | find-one case: Resulting Boolean assuming carry in to group | find-zero case: Resulting Boolean assuming no carry in to group |
|---|---|---|---|---|---|
| 0 | WVGG | PZGG | 1110 | 1111 | 1110 |
|   |      | ZGGG |      |      |      |
|   | GGGG | GGGG |      |      |      |
|   | PPWV | PPPZ |      |      |      |
|   |      | PPZG |      |      |      |
| 1 | PPPP | PPPP | 1111 | 0000 | 1111 |
| 2 | XYZZ | PGZZ | 0000 | 0001 | 0000 |
|   |      | GZZZ |      |      |      |
|   |      | ZZZZ | ZZZZ |      |      |
|   | PPXY | PPPG |      |      |      |
|   |      | PPGZ |      |      |      |

As shown in Table 7, intermediate node 0 of FIG. 8B is asserted when the group has the pattern "1110" and there may or may not be a carry in to the group. If there is a carry in, the group will be all ones. If there is no carry in, the group will have both ones and zeros. Therefore, turning to FIG. 8C, if a carry in is assumed for the find-one case as discussed above, the proper output of the gate for the find-one case is "f1__nf0," which corresponds to "find-one case, not found zero [in the group]." If no carry in is assumed for the find-zero case as discussed above, the proper output of the gate for the find-zero case is "f0__fboth," which corresponds to "find-zero case, found both [in the group]." As shown in FIG. 8C, the Level Two logic gate produces the appropriate outputs for a given 2-dit group for both the find-zero case and the find-one case by applying the above carry in assumptions when the two-dit pattern is one of the patterns shown in Table 7, and when the actual carry in from the top dit of the prior group is not ascertainable.

"f0__shift-0" is asserted when zeros are predicted for group 4 of the single precision intermediate result mantissa; "f0__shift-4" is asserted when all ones are predicted for group 4 and zeros are predicted for group 3; "f0__shift-8" is asserted when all ones are predicted for groups 4 and 3 and zeros are predicted for group 2; and "f0__shift-12" is asserted when all ones are predicted for groups 4, 3, and 2. This signal is used for medium shifting in the find-zero case when the coarse shift select output was "f0__shift-0", indicating that the LZA found a zero somewhere within the first sixteen bits.

Figure 14:
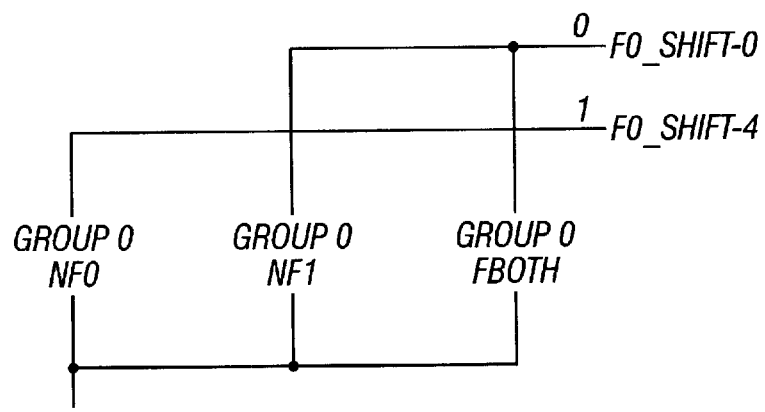
FIG. 14 is a shorthand representation of one embodiment of a Level Three gate that produces a 1-of-2 medium shift select signal for the find-zero case.

On the other hand, in the find-zero case, if the LZA does not predict a zero in the first four groups of the intermediate result mantissa, the coarse shift select output is "f0__shift-16," as described above. In that case, the proper shift select output that must be provided to the medium shifter is shown in FIG. 14. FIG. 14 is a shorthand representation of one embodiment of a Level Three gate that produces a 1-of-2 medium shift select signal for the find-zero case where the

TABLE 8

Truth Table for Level Two Gates

| Level One dit N + 1 PGZ output (1-of-6) | Level One dit N PGZ output (1-of-6) | Level One dit N-1 carry out output (1-of-3) | Level Two group (N-1)/2 find-zero output (1-of-3) | Level Two group (N-1)/2 find-one output (1-of-3) |
|---|---|---|---|---|
| PP | PP | ncout | nf0 | nf0 |
| PP | PP | cout | nf1 | nf1 |
| PP | PP | dkcout | nf0 | nf1 |
| PP | XY | ncout | nf1 | nf1 |
| PP | XY | cout | fboth | fboth |
| PP | XY | dkcout | nf1 | fboth |
| PP | WV | ncout | fboth | fboth |
| PP | WV | cout | nf0 | nf0 |
| PP | WV | dkcout | fboth | nf0 |
| XY | ZZ | ncout | nf1 | nf1 |
| XY | ZZ | cout | fboth | fboth |
| XY | ZZ | dkcout | nf1 | fboth |
| WV | GG | ncout | fboth | fboth |
| WV | GG | cout | nf0 | nf0 |
| WV | GG | dkcout | fboth | nf0 |
| GG | GG | ncout | fboth | fboth |
| GG | GG | cout | nf0 | nf0 |
| GG | GG | dkcout | fboth | nf0 |
| ZZ | ZZ | ncout | nf1 | nf1 |
| ZZ | ZZ | cout | fboth | fboth |
| ZZ | ZZ | dkcout | nf1 | fboth |

Level Three Logic

In Level Three, find-zero and find-one outputs for each group from Level Two are combined to form coarse shift select signals and medium shift select signals for the find-one and find-zero cases.

Figure 11:
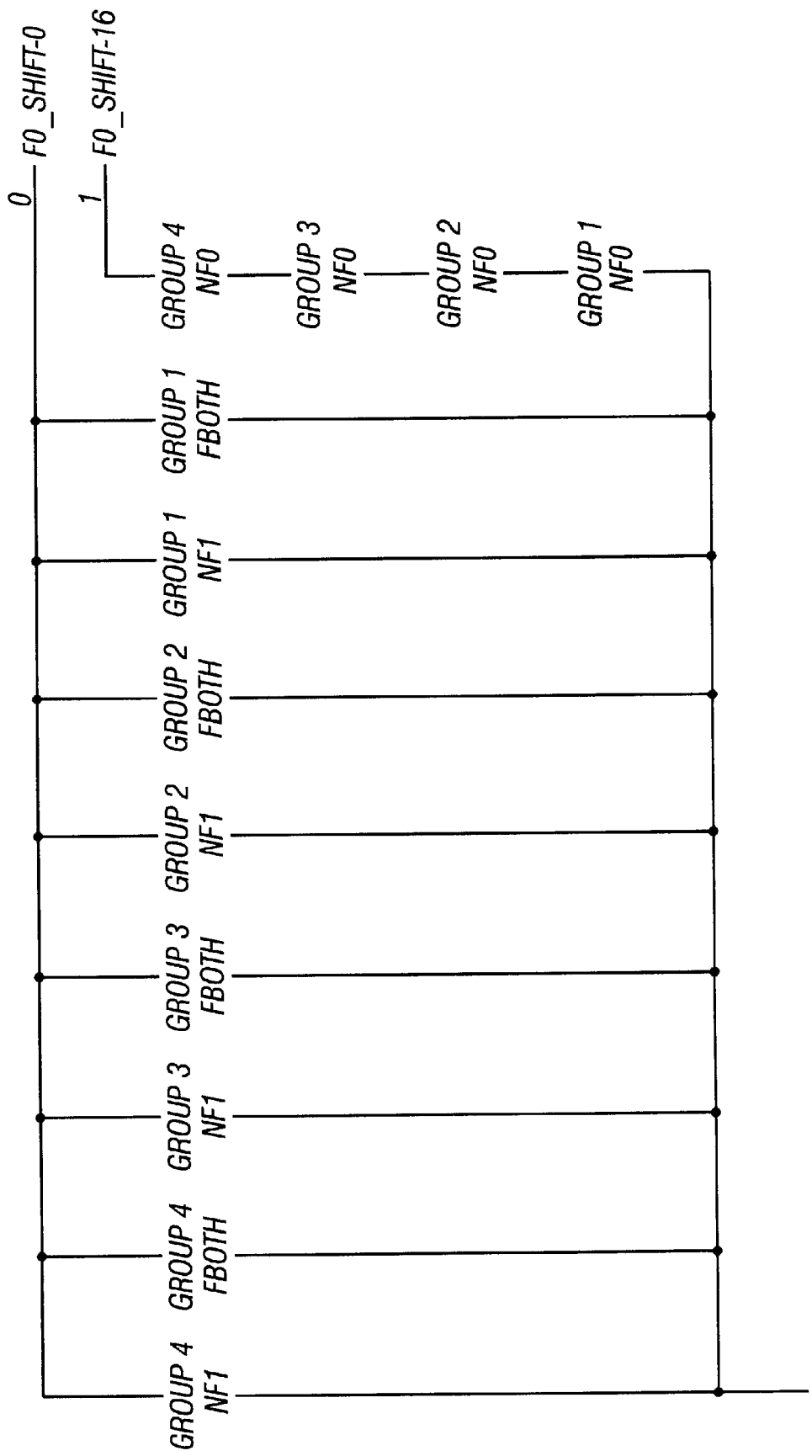
FIG. 11 is a shorthand representation of one embodiment of a Level Three gate that produces a 1-of-2 coarse shift select signal for the find-zero case.

FIG. 11 is a shorthand representation of one embodiment of a Level Three gate that produces a 1-of-2 coarse shift select signal for the find-zero case. As shown in FIG. 11, "f0__shift-0" is asserted when zeros are predicted for any of the top four groups of the single precision intermediate result mantissa. When no zeros are predicted in any of the top four groups of the result, "f0__shift-16" is asserted.

Figure 12:
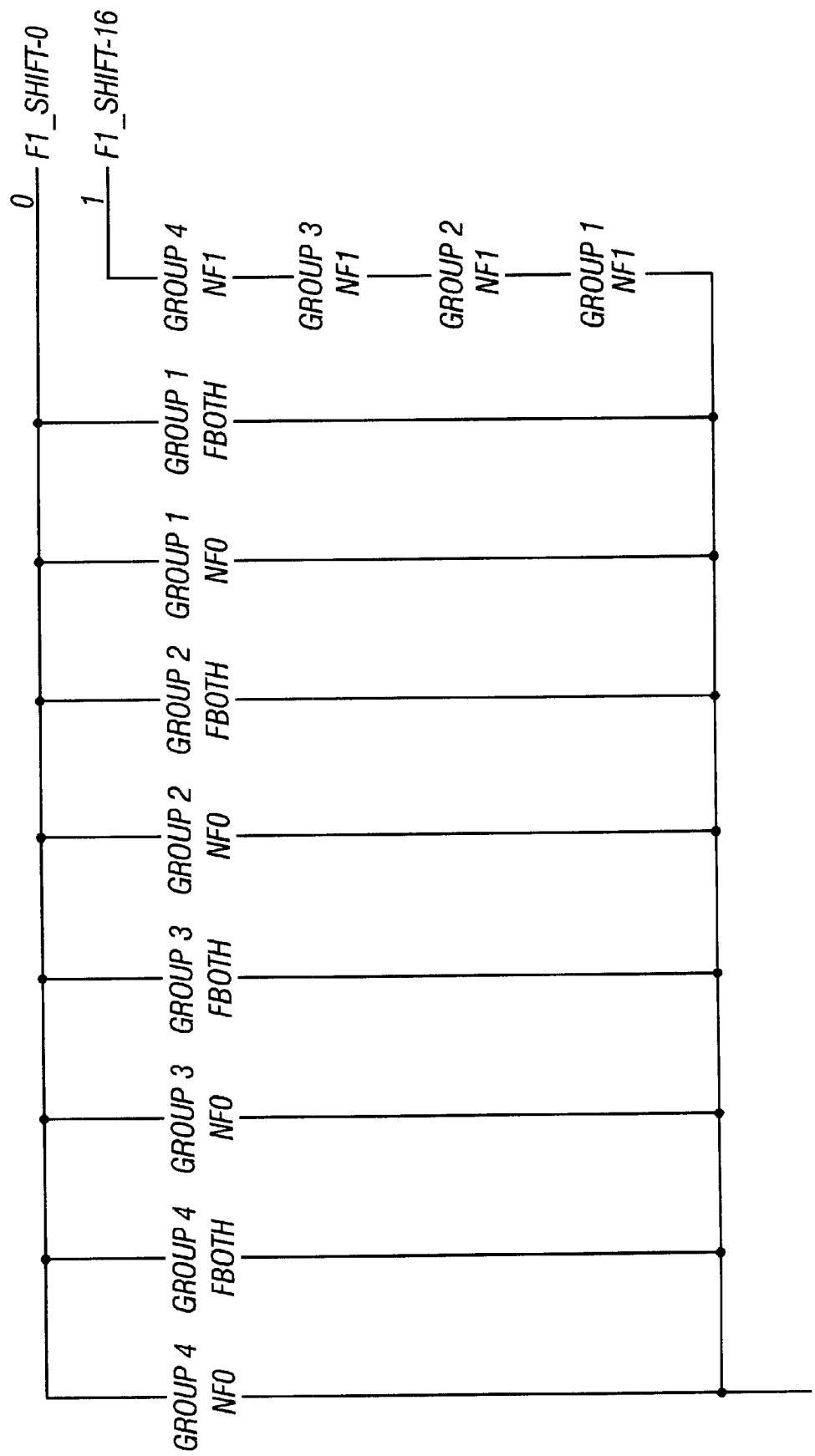
FIG. 12 is a shorthand representation of one embodiment of a Level Three gate that produces a 1-of-2 coarse shift select signal for the find-one case.

FIG. 12 is a shorthand representation of one embodiment of a Level Three gate that produces a 1-of-2 coarse shift select signal for the find-one case. As shown in FIG. 12, "f1__shift-0" is asserted when ones are predicted for any of the top four groups of the single precision intermediate result mantissa. When no ones are predicted in any of the top four groups of the result, "f1__shift-16" is asserted.

Figure 13:
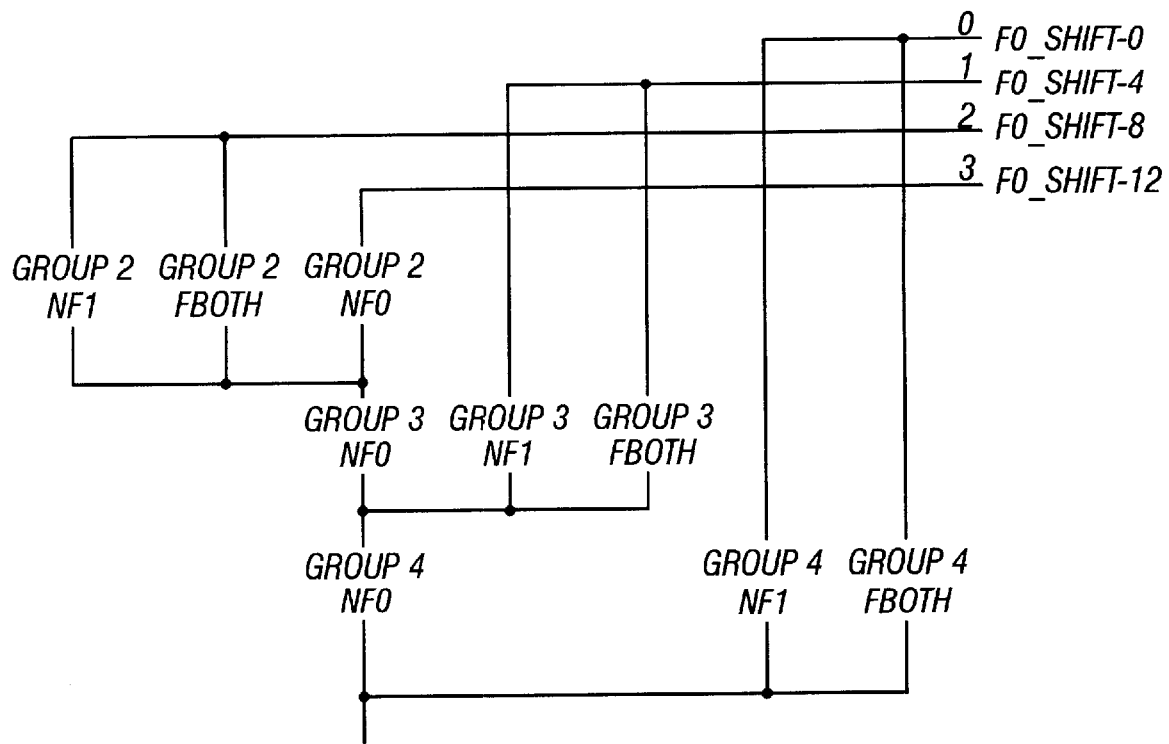
FIG. 13 is a shorthand representation of one embodiment of a Level Three gate that produces a 1-of-4 medium shift select signal for the find-zero case.

FIG. 13 is a shorthand representation of one embodiment of a Level Three gate that produces a 1-of-4 medium shift select signal for the find-zero case. As shown in FIG. 13, single precision intermediate result mantissa has been shifted 16 bits by the coarse shifter. As shown in FIG. 14, the only group relevant to the medium shifter at this point is group 0. In the find-zero case, "f0__shift-0" is asserted when zeros are predicted for group 0; "f0__shift-4" is asserted when group 0 is all ones.

Figure 15:
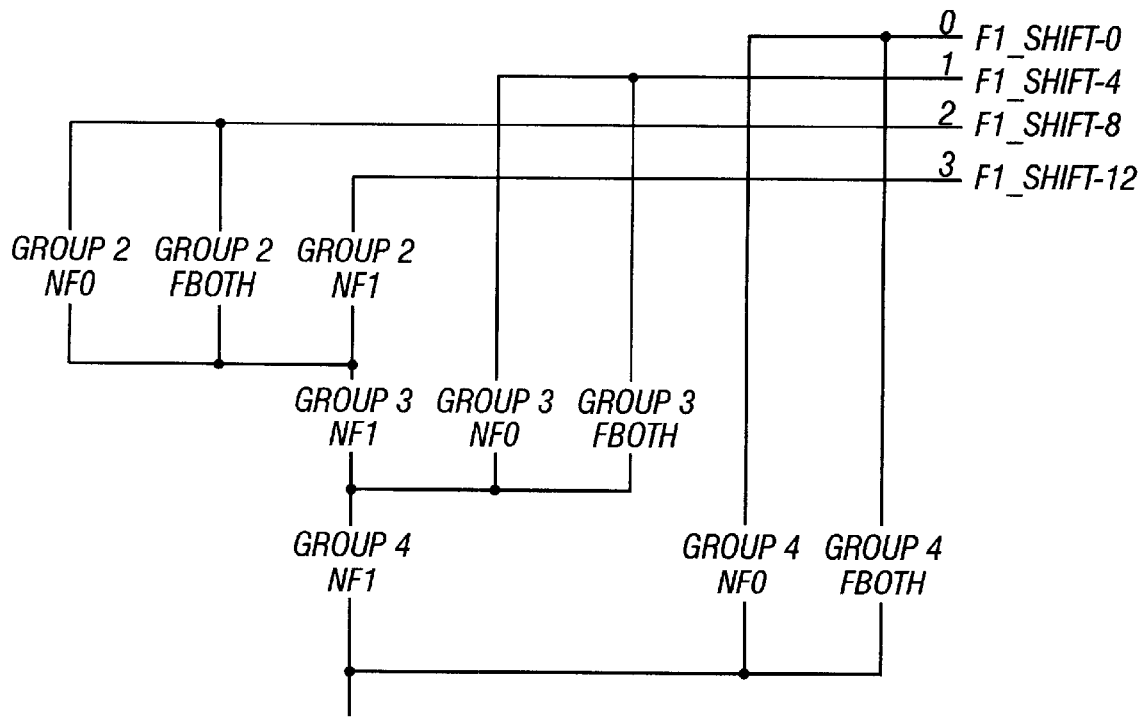
FIG. 15 is a shorthand representation of one embodiment of a Level Three gate that produces a 1-of-4 medium shift select signal for the find-one case.

FIG. 15 is a shorthand representation of one embodiment of a Level Three gate that produces a 1-of-4 medium shift select signal for the find-one case. As shown in FIG. 15, "f1__shift-0" is asserted when ones are predicted for group 4 of the single precision intermediate result mantissa; "f1__shift-4" is asserted when all zeros are predicted for group 4 and ones are predicted for group 3; "f1__shift-8" is asserted when all zeros are predicted for groups 4 and 3 and ones are predicted for group 2; and "f1__shift-12" is asserted when all zeros are predicted for groups 4, 3, and 2. This signal is used for medium shifting in the find-one case when the coarse shift select output was "f1__shift-0", indicating that the LZA found a one somewhere within the first sixteen bits.

Figure 16:
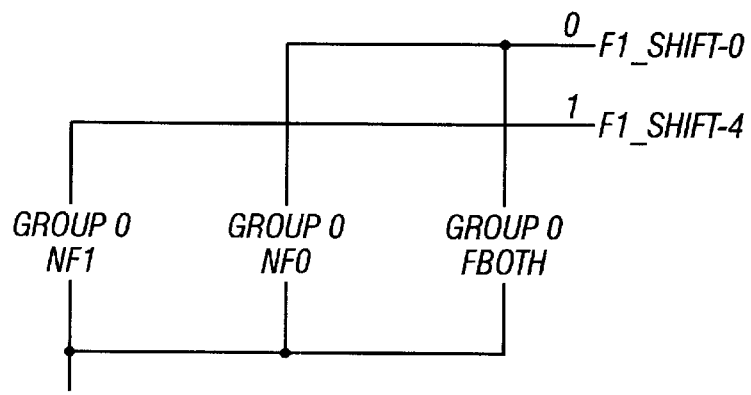
FIG. 16 is a shorthand representation of one embodiment of a Level Three gate that produces a 1-of-2 medium shift select signal for the find-one case.

On the other hand, in the find-one case, if the LZA does not predict a one in the first four groups of the single precision intermediate result mantissa, the coarse shift select output is "f1_shift-16," as described above. In that case, the proper shift select output that must be provided to the medium shifter is shown in FIG. 16. FIG. 16 is a shorthand representation of one embodiment of a Level Three gate that produces a 1-of-2 medium shift select signal for the find-one case where the single precision intermediate result mantissa has been shifted 16 bits by the coarse shifter. As shown in FIG. 16, the only group relevant to the medium shifter at this point is group 0. In the find-one case, "f1_shift-0" is asserted when ones are predicted for group 0; "f1_-shift-4" is asserted when group 0 is all zeros.

In sum, the present invention is a leading zero/leading one anticipator that can operate in parallel with a floating point adder and that produces coarse and medium shift select signals for the coarse and medium shifters in the normalizer. In one embodiment, the present invention can be implemented in three levels of N-NARY logic, wherein the first logic level examines input dits of the adder operands and generates a propagate-generate-zero (PGZ) pattern for the corresponding dit of the adder result. The first logic level also generates carry out signals that correspond to certain dit positions of the adder result. The second logic level produces a find-zero and a find-one output signal for each two-dit group of the adder result by combining PGZ patterns for the two dits within the group with the carry-out signal from the dit immediately preceding the two-dit group. The third logic level combines find-zero and find-one output signals for each two-dit group of the adder result to produce find-one and find-zero coarse and medium shift select signals.

Other embodiments of the invention will be apparent to those skilled in the art after considering this specification or practicing the disclosed invention. The specification and examples above are exemplary only, with the true scope of the invention being indicated by the following claims.

We claim:

1. A leading zero/leading one anticipator that can operate in parallel with a floating point adder, comprising:
   a first logic level that generates a first plurality of PGZ patterns that correspond to a first plurality of dit positions of the adder result, and a second plurality of carry out signals that correspond to a second plurality of dit positions of the adder result;
   a second logic level that combines said PGZ patterns with said carry-out signals to produce a find-zero and a find-one output signal for a third plurality of two-dit groups of the adder result;
   a third logic level that combines said find-zero and find-one output signals for said third plurality of two-dit groups to produce a find-one coarse shift select signal, a find-zero coarse shift select signal, a plurality of find-one medium shift select signals, and a plurality of find-zero medium shift select signals.

2. The leading zero/leading one anticipator of claim 1, wherein said first logic level, said second logic level, and said third logic level are implemented in N-NARY logic.

3. The leading zero/leading one anticipator of claim 2, wherein said first logic level generates each said PGZ pattern for each dit position within said first plurality of dit positions of the adder result by comparing the value of the corresponding dit positions of the adder input operands.

4. The leading zero/leading one anticipator of claim 2, wherein said first logic level generates said carry-out signal for each dit position within said second plurality of dit positions of the adder result by comparing the value of corresponding dit positions of the adder input operands.

5. The leading zero/leading one anticipator of claim 2, wherein said second logic level produces said find-zero and said find-one output signal for each two-dit group of the adder result by combining said PGZ pattern for dit N with said PGZ pattern for dit N+1 and said carry-out signal for dit N−1.

6. The leading zero/leading one anticipator of claim 5, wherein said second logic level produces said find-zero output signal for each two-dit group of the adder result by further treating an indeterminate carry out for dit N−1 as a no carry out when said PGZ pattern for said dits N and N+1 corresponds to the two-dit value 0000, 1111, or 1110.

7. The leading zero/leading one anticipator of claim 5, wherein said second logic level produces said find-one output signal for each two-dit group of the adder result by further treating an indeterminate carry out for dit N−1 as a carry out when said PGZ pattern for said dits N and N+1 corresponds to the two-dit value 0000, 1111, or 1110.

8. A leading zero/leading one anticipation system that can operate in parallel with a floating point adder, comprising:
   a first logic level that generates a first plurality of PGZ patterns that correspond to a first plurality of dit positions of the adder result, and a second plurality of carry out signals that correspond to a second plurality of dit positions of the adder result;
   a second logic level that combines said PGZ patterns with said carry-out signals to produce a find-zero and a find-one output signal for a third plurality of two-dit groups of the adder result;
   a third logic level that combines said find-zero and find-one output signals for said third plurality of two-dit groups to produce a find-one coarse shift select signal, a find-zero coarse shift select signal, a plurality of find-one medium shift select signals, and a plurality of find-zero medium shift select signals.

9. The system of claim 8, wherein said first logic level, said second logic level, and said third logic level are implemented in N-NARY logic.

10. The system of claim 9, wherein said first logic level generates each said PGZ pattern for each dit position within said first plurality of dit positions of the adder result by comparing the value of the corresponding dit positions of the adder input operands.

11. The system of claim 9, wherein said first logic level generates said carry-out signal for each dit position within said second plurality of dit positions of the adder result by comparing the value of corresponding dit positions of the adder input operands.

12. The system of claim 9, wherein said second logic level produces said find-zero and said find-one output signal for each two-dit group of the adder result by combining said PGZ pattern for dit N with said PGZ pattern for dit N+1 and said carry-out signal for dit N−1.

13. The system of claim 12, wherein said second logic level produces said find-zero output signal for each two-dit group of the adder result by further treating an indeterminate carry out for dit N−1 as a no carry out when said PGZ pattern for said dits N and N+1 corresponds to the two-dit value 0000, 1111, or 1110.

14. The system of claim 12, wherein said second logic level produces said find-one output signal for each two-dit group of the adder result by further treating an indeterminate carry out for dit N−1 as a carry out when said PGZ pattern for said dits N and N+1 corresponds to the two-dit value 0000, 1111, or 1110.

15. A method that makes a leading zero/leading one anticipator that can operate in parallel with a floating point adder, comprising:
   providing a first logic level that generates a first plurality of PGZ patterns that correspond to a first plurality of dit positions of the adder result, and a second plurality of carry out signals that correspond to a second plurality of dit positions of the adder result;

providing a second logic level that combines said PGZ patterns with said carry-out signals to produce a find-zero and a find-one output signal for a third plurality of two-dit groups of the adder result; and providing a third logic level that combines said find-zero and find-one output signals for said third plurality of two-dit groups to produce a find-one coarse shift select signal, a find-zero coarse shift select signal, a plurality of find-one medium shift select signals, and a plurality of find-zero medium shift select signals.

16. The method of claim 15, wherein said first logic level, said second logic level, and said third logic level are implemented in N-NARY logic.

17. The method of claim 16, wherein said first logic level generates each said PGZ pattern for each dit position within said first plurality of dit positions of the adder result by comparing the value of the corresponding dit positions of the adder input operands.

18. The method of claim 16, wherein said first logic level generates each said carry-out signal for each dit position within said second plurality of dit positions of the adder result by comparing the value of corresponding dit positions of the adder input operands.

19. The method of claim 16, wherein said second logic level produces said find-zero and said find-one output signal for each two-dit group of the adder result by combining said PGZ pattern for dit N with said PGZ pattern for dit N+1 and said carry-out signal for dit N−1.

20. The method of claim 19, wherein said second logic level produces said find-zero output signal for each two-dit group of the adder result by further treating an indeterminate carry out for dit N−1 as a no carry out when said PGZ pattern for said dits N and N+1 corresponds to the two-dit value 0000, 1111, or 1110.

21. The method of claim 19, wherein said second logic level produces said find-one output signal for each two-dit group of the adder result by further treating an indeterminate carry out for dit N−1 as a carry out when said PGZ pattern for said dits N and N+1 corresponds to the two-dit value 0000, 1111, or 1110.

22. A method that predicts the location of the leading zero and the leading one of a floating point adder intermediate result, comprising:

generating a first plurality of PGZ patterns that correspond to a first plurality of dit positions of the adder result, and a second plurality of carry out signals that correspond to a second plurality of dit positions of the adder result;

combining said PGZ patterns with said carry-out signals to produce a find-zero and a find-one output signal for a third plurality of two-dit groups of the adder result; and combining said find-zero and find-one output signals for said third plurality of two-dit groups to produce a find-one coarse shift select signal, a find-zero coarse shift select signal, a plurality of find-one medium shift select signals, and a plurality of find-zero medium shift select signals.

23. The method of claim 22, further comprising utilizing N-NARY logic.

24. The method of claim 23, wherein each said PGZ pattern for each dit position within said first plurality of dit positions of the adder result is generated by comparing the value of the corresponding dit positions of the adder input operands.

25. The method of claim 23, wherein each said carry-out signal for each dit position within said second plurality of dit positions of the adder result is generated by comparing the value of corresponding dit positions of the adder input operands.

26. The method of claim 23, wherein said find-zero and said find-one output signal for each two-dit group of the adder result are generated by combining said PGZ pattern for dit N with said PGZ pattern for dit N+1 and said carry-out signal for dit N−1.

27. The method of claim 26, wherein said find-zero output signal for each two-dit group of the adder result is further generated by treating an indeterminate carry out for dit N−1 as a no carry out when said PGZ pattern for said dits N and N+1 corresponds to the two-dit value 0000, 1111, or 1110.

28. The method of claim 26, wherein said find-one output signal for each two-dit group of the adder result is further generated by treating an indeterminate carry out for dit N−1 as a carry out when said PGZ pattern for said dits N and N+1 corresponds to the two-dit value 0000, 1111, or 1110.

* * * * *